UNITED STATES PATENT OFFICE.

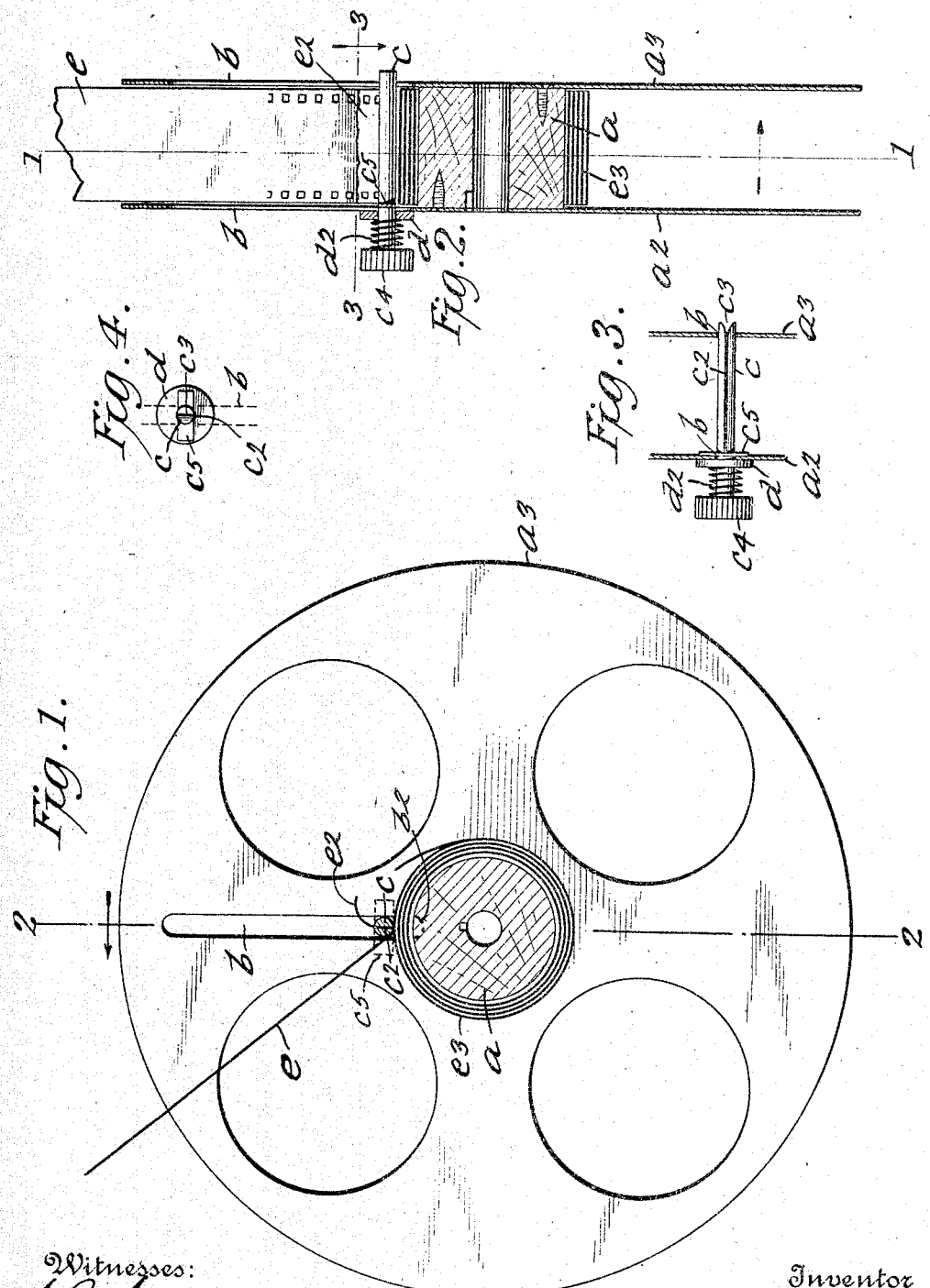

LOUIS S. FRAPPIER, OF BROOKLYN, NEW YORK, ASSIGNOR TO THE PRECISION MACHINE COMPANY, OF NEW YORK, N. Y., A CORPORATION OF NEW YORK.

REEL.

1,172,349. Specification of Letters Patent. Patented Feb. 22, 1916.

Application filed April 25, 1913. Serial No. 763,488.

*To all whom it may concern:*

Be it known that I, LOUIS S. FRAPPIER, a citizen of the United States of America, and residing at Brooklyn, in the county of Kings and State of New York, have invented certain new and useful Improvements in Reels, of which the following is a specification, such as will enable those skilled in the art to which it appertains to make and use the same.

This invention relates to moving picture apparatus, with particular reference to what is known as the take-up reels whereon the film is wound after projection, although I do not confine myself to such use of my invention.

In projectors of modern construction the film is moved intermittently across the aperture by means of suitable mechanism, such as sprockets or the like, after which it is actuated steadily by constantly moving means, a loop of film being maintained between said means, normally, to prevent any strain on the film which might cause it to tear, but it often happens that the film slips at the constantly moving sprockets because of the joint between film sections being thicker than the film proper, or for other causes, the take-up reels then causing the loop of film to be taken up instantly with the result that, when the constantly moving sprockets again engage the film, there is no loop between the intermittently moving means and the constantly moving means and the latter tears the film. It is the practice now, when such tears occur, to stop the projector operation, draw down enough film, manually, to encircle the take-up reel several times, this being accomplished by inserting the fingers carrying the torn end of the film between the cheeks of the reel, arranging the said end on the reel, and then revolving the latter several times until a sufficient strain is exerted on the film to again draw the same from the constantly moving means, but sufficient film is permitted to remain between the intermittent and constant means to again form the loop referred to, and my invention was designed to overcome this lengthly and arduous operation of engaging the film with the reel, either originally or after a tear.

My invention is fully described in the following specification, of which the accompanying drawings form a part, in which the separate parts are designated by the same reference characters in each of the views, and in which:—

Figure 1 is a central section taken through a reel of conventional type and showing my invention therein in the step of reëngaging a torn film with the reel; Fig. 2 is a transverse section on the line 2—2 of Fig. 1; Fig. 3 is a section on the line 3—3 of Fig. 2; and Fig. 4 is an inner end view of my invention removed from the reel.

In the drawings forming a part of this application I have shown a take-up reel comprising the central, circular, spool $a$ and side cheeks $a^2$ and $a^3$, each of which I provide with one or more radial slots $b$ in pairs, only one pair being shown, and the said slots being directly opposite each other in each pair, and, while conventional reels are now provided with a spring-frictional, clip for the original engagement with the film, I have not shown the same as it forms no part of my invention and may or may not be provided.

The present form of embodiment of my invention consists of a longitudinally split pin $c$, the split being shown at $c^2$ and the tines of the fork so formed are sufficiently close to each other to insure a frictional engagement of the film therebetween, and I prefer to flare the outer end of the slot so formed to guide the film between the tines, as shown at $c^3$, the pin $c$ being of slightly smaller diameter than the width of the slots $b$ in which it rests or moves.

The pin $c$ is provided with a handle $c^4$ and with a fixed plate $c^5$ closely adjacent the inner end of the slot $c^2$, said plate being of a width in one direction of slightly less dimension than the width of the slots $b$, and being of a length greatly exceeding the width of the said slots, whereby the pin may be withdrawn from the reel in one position of said plate $c^5$ and not in a position at right angles to said first position.

Arranged slidably on the pin $c$, between the handle and the plate $c^5$ is a disk $d$ of a diameter approximating the length of the plate $c^5$, a coil spring $d^2$ being interposed between said disk and the handle whereby the disk is normally held against the plate $c^5$, this being to insure a frictional engagement of one of the cheeks of the reel therebetween in any position along the length of the corresponding slot $b$.

If a break should occur in the film during projection of the pictures thereon, the torn end not in engagement with the reel is drawn downwardly sufficiently far to provide the loop already referred to, the pin $c$ inserted into the slot $b$ of the outer cheek $a^2$ adjacent the periphery of the cheek, and the end of the film passed between the tines of the pin fork until it reaches the inner end of the split therebetween, the film being between the cheeks of the reel, after which the pin is moved inwardly along the slots $b$ to a position adjacent the wound portion of the film, the film being shown at $e$, the end at $e^2$, and the wound portion at $e^3$. In this operation the plate $c^5$ has been arranged longitudinally of the slot $b$ in which it is sliding but, when a desired position of the pin is reached, the handle is forced inwardly against the action of the spring, thus moving the plate $c^5$ out of the slot $b$, at which time the handle and pin are rotated through approximately ninety degrees of a circle and the handle released, the plate $c^5$ now being arranged transversely of the slot $b$ and the device is frictionally locked on the cheek $a^2$ with the film end frictionally held in the split $c^2$ of the pin under sufficient tension to insure film movement and the renewal of projector operation begins, this reëngagement of the film end not requiring more than a fraction of a second, and, as soon as the reel has been revolved several times, the film is held thereon by the friction of the turns around the spool $a$ and the pin may be removed by merely rotating through an arc of a circle sufficiently great to bring the plate $c^5$ in line with the slot $b$ and withdrawing the entire device, ready for another break in the film.

My device may also be used at the beginning of the film length, in the same manner as already described, in which event I prefer to continue the slots $b$ inwardly and groove the spool $a$, as indicated by dotted lines in Fig. 1, at $b^2$, in order to bury, or partially bury, the pin whereby the film winds directly on the spool without binding the pin which may be instantly withdrawn for continuing projection, in the event of a break in the film, in the manner stated.

While I have shown one form of embodiment for accomplishing the desired result of instant renewal of projection in the event of a break in the film, other forms may be devised which might be in permanent but slidable connection with the film and, further, although I have elected in the present showing to frictionally engage the film end between the tension forks of the pin $c$, I may dispense with this and lay the torn end of the film directly on the spool $a$ or on the film wound thereon, and then move my device against said torn end on the spool and hold it there in the manner already set forth, or in any other manner, provided that the film end was frictionally held by the pin, either against the spool or otherwise.

My device is very simple in construction and use, is very inexpensive, and avoids the very annoying delays occasioned by a break in the film, and it may also be employed in the circles or other openings in reel cheeks always provided for lightness and for access to the film, without the necessity for providing the slots $b$, but I prefer to provide the reels already adapted for use with the particular form of film holding pin which I market.

Having fully described my invention, what I claim as new, and desire to secure by Letters Patent, is:—

1. The combination with a film reel, of a device provided with means for engagement with the end of a film section and means affording provision for connection to the reel at different distances from the hub, said film engagement means being adapted for disconnection from one film portion wound upon the reel and connection with another film portion whereby the latter may be wound on the former.

2. The combination with a film reel, of a device provided with means for engagement with the end of a film section and means for connection to the reel, said film engagement means being adapted for disconnection from one film portion wound upon the reel and connection with another film portion whereby the latter may be wound on the former, said reel connection means being radially adjustable on said reel.

3. The combination with a film reel, of a split pin adapted to receive and hold the end of a strip of film, and means for adjustably holding said pin on said reel, said pin being adapted for disconnection from one film portion wound upon the reel and connection with another film portion whereby the latter may be wound on the former.

4. The combination with a film reel, of a split pin adapted to receive and hold the end of a strip of film, and means for holding said pin in desired position on said reel, radially thereof, said device being adapted to be removed from engagement with one part of the film wound upon the reel and be secured to the reel at a different distance from the hub to engage the film, whereby a separate film portion may be wound on a preceding portion.

5. The combination of a film reel provided with radial slots in the sides thereof, of a device having means for positive engagement with the end of a film, and means for connecting said device with said reel at any desired point along one of said slots, said device being adapted to be removed from engagement with one part of the film wound upon the reel and be secured to the reel at a different distance from the hub to engage the film, whereby a separated film portion may be wound on a preceding portion.

6. In combination with a device adapted for detachable connection with the end of a film portion, of a reel provided with an opening in the side thereof for the passage of said device and wherein said device is adjustably held, said device being adapted to be removed from engagement with one part of the film wound upon the reel and be secured to the reel at a different distance from the hub to engage the film, whereby a separated film portion may be wound on a preceding film portion.

In testimony that I claim the foregoing as my invention I have signed my name in presence of the subscribing witnesses this 14th day of April, 1913.

LOUIS S. FRAPPIER.

Witnesses:
 GEORGE F. BENTLEY,
 J. C. LARSEN.